US012640939B2

(12) United States Patent
Nachbaur

(10) Patent No.: US 12,640,939 B2
(45) Date of Patent: May 26, 2026

(54) SERVER VERIFICATION VIA KEY PINNING

(71) Applicant: OKTA, INC., San Francisco, CA (US)

(72) Inventor: Alexander Minerva Nachbaur, Surrey (CA)

( * ) Notice: Subject to any disclaimer, the term of this patent is extended or adjusted under 35 U.S.C. 154(b) by 54 days.

(21) Appl. No.: 18/774,753

(22) Filed: Jul. 16, 2024

(65) Prior Publication Data

US 2026/0025285 A1 Jan. 22, 2026

(51) Int. Cl.
| | |
|---|---|
| *G06F 21/00* | (2013.01) |
| *H04L 9/30* | (2006.01) |
| *H04L 9/32* | (2006.01) |
| *H04L 29/06* | (2006.01) |

(52) U.S. Cl.
CPC .......... *H04L 9/3271* (2013.01); *H04L 9/3073* (2013.01); *H04L 9/3218* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 10,454,689 | B1 * | 10/2019 | Sharifi Mehr | ........ H04L 63/166 |
| 2025/0112786 | A1 * | 4/2025 | Poola | ...................... H04L 9/085 |

* cited by examiner

*Primary Examiner* — Lisa C Lewis
(74) *Attorney, Agent, or Firm* — Holland & Hart LLP

(57) ABSTRACT

An identity management system may support an authentication server. According to techniques described herein, a client device may receive an authentication challenge from the authentication server. The authentication challenge may include an indication of a first public key of a first keypair, a first signature of a first private key of the first keypair, and second signatures of second private keys of second keypairs. The client device may determine whether the first public key is a trusted key that is pinned by the client device. The client device may determine, based on determining that the first public key is not the trusted key that is pinned by the client device, whether at least one signature of the second signatures can be validated by the trusted key. The client device may validate the authentication challenge based on determining that the at least one signature can be validated by the trusted key.

20 Claims, 9 Drawing Sheets

Key Chain Verification Component

Authentication Challenge Component

525

Input Module

510

Pinned Key Component

530

Output Module

515

Authentication Challenge Validation Component

535

520

505

500

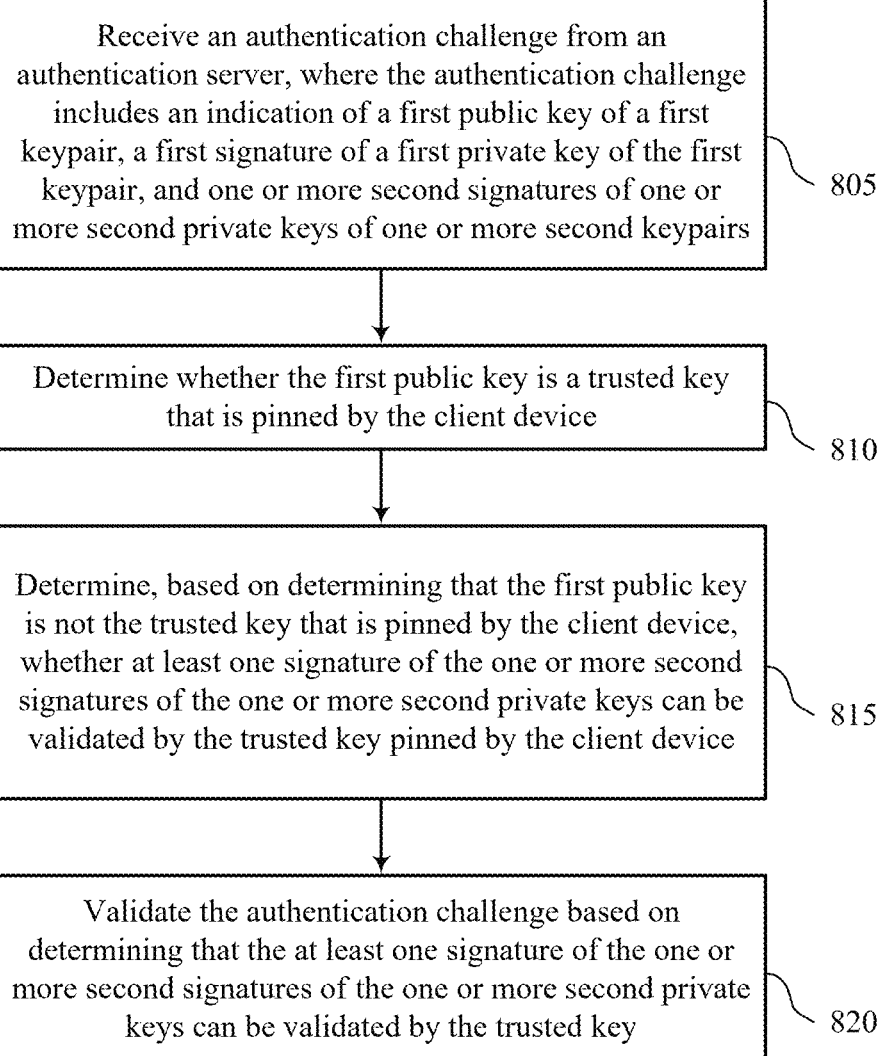

Receive an authentication challenge from an authentication server, where the authentication challenge includes an indication of a first public key of a first keypair, a first signature of a first private key of the first keypair, and one or more second signatures of one or more second private keys of one or more second keypairs — 805

Determine whether the first public key is a trusted key that is pinned by the client device — 810

Determine, based on determining that the first public key is not the trusted key that is pinned by the client device, whether at least one signature of the one or more second signatures of the one or more second private keys can be validated by the trusted key pinned by the client device — 815

Validate the authentication challenge based on determining that the at least one signature of the one or more second signatures of the one or more second private keys can be validated by the trusted key — 820

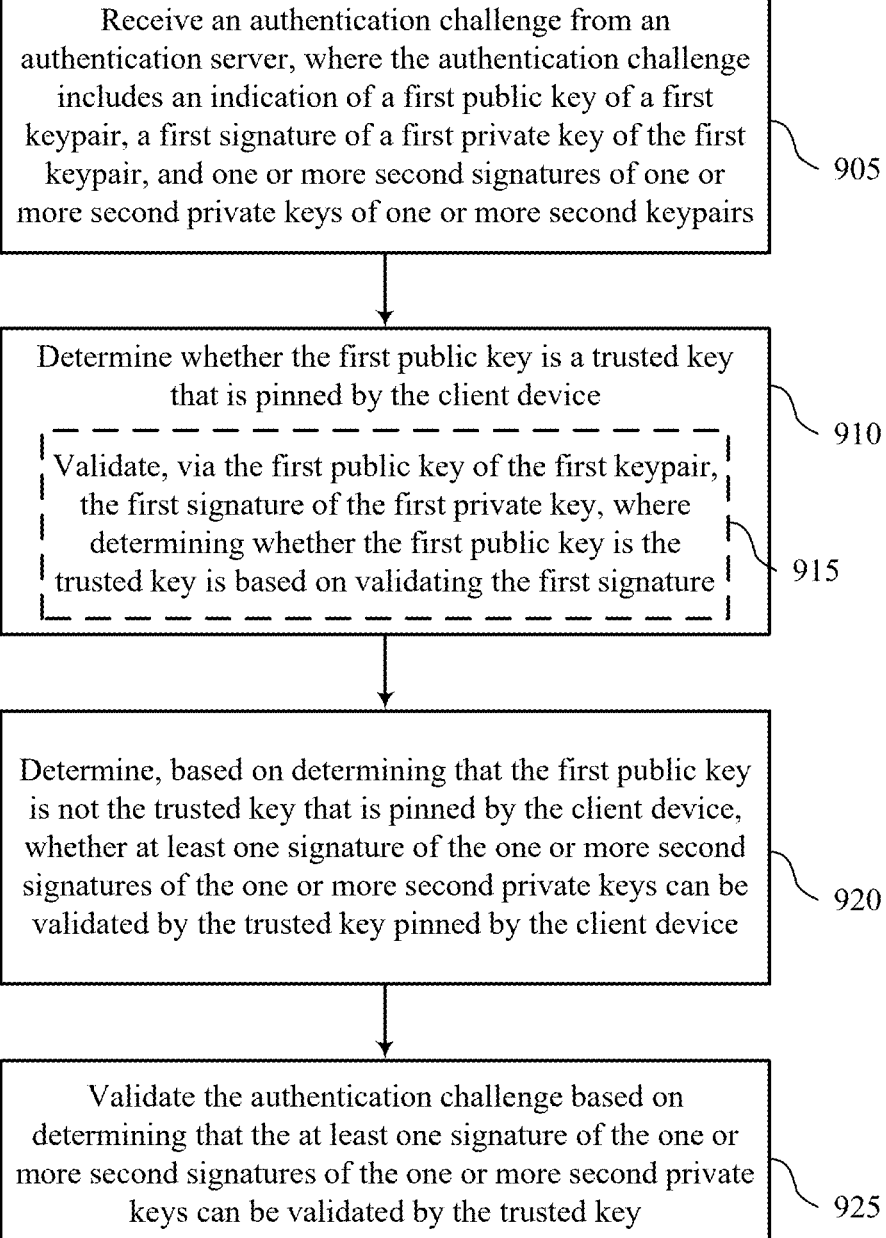

Receive an authentication challenge from an authentication server, where the authentication challenge includes an indication of a first public key of a first keypair, a first signature of a first private key of the first keypair, and one or more second signatures of one or more second private keys of one or more second keypairs

905

Determine whether the first public key is a trusted key that is pinned by the client device

910

Validate, via the first public key of the first keypair, the first signature of the first private key, where determining whether the first public key is the trusted key is based on validating the first signature

915

Determine, based on determining that the first public key is not the trusted key that is pinned by the client device, whether at least one signature of the one or more second signatures of the one or more second private keys can be validated by the trusted key pinned by the client device

920

Validate the authentication challenge based on determining that the at least one signature of the one or more second signatures of the one or more second private keys can be validated by the trusted key

SERVER VERIFICATION VIA KEY PINNING

FIELD OF TECHNOLOGY

The present disclosure relates generally to identity management, and more specifically to server verification via key pinning.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials. In some cases, a client and a server may exchange data based on the server proving possession of a trusted key pinned by the client.

SUMMARY

A method for key pinning by a client device is described. The method may include receiving an authentication challenge from an authentication server, where the authentication challenge includes an indication of a first public key of a first keypair, a first signature of a first private key of the first keypair, and one or more second signatures of one or more second private keys of one or more second keypairs, determining whether the first public key is a trusted key that is pinned by the client device, determining, based on determining that the first public key is not the trusted key that is pinned by the client device, whether at least one signature of the one or more second signatures of the one or more second private keys can be validated by the trusted key pinned by the client device, and validating the authentication challenge based on determining that the at least one signature of the one or more second signatures of the one or more second private keys can be validated by the trusted key.

A client device for key pinning is described. The client device may include one or more memories storing processor executable code, and one or more processors coupled with the one or more memories. The one or more processors may individually or collectively be operable to execute the processor-executable code to cause the client device to receive an authentication challenge from an authentication server, where the authentication challenge includes an indication of a first public key of a first keypair, a first signature of a first private key of the first keypair, and one or more second signatures of one or more second private keys of one or more second keypairs, determine whether the first public key is a trusted key that is pinned by the client device, determine, based on determining that the first public key is not the trusted key that is pinned by the client device, whether at least one signature of the one or more second signatures of the one or more second private keys can be validated by the trusted key pinned by the client device, and validate the authentication challenge based on determining that the at least one signature of the one or more second signatures of the one or more second private keys can be validated by the trusted key.

Another client device for key pinning is described. The client device may include means for receiving an authentication challenge from an authentication server, where the authentication challenge includes an indication of a first public key of a first keypair, a first signature of a first private key of the first keypair, and one or more second signatures of one or more second private keys of one or more second keypairs, means for determining whether the first public key is a trusted key that is pinned by the client device, means for determining, based on determining that the first public key is not the trusted key that is pinned by the client device, whether at least one signature of the one or more second signatures of the one or more second private keys can be validated by the trusted key pinned by the client device, and means for validating the authentication challenge based on determining that the at least one signature of the one or more second signatures of the one or more second private keys can be validated by the trusted key.

A non-transitory computer-readable medium storing code for key pinning is described. The code may include instructions executable by one or more processors to receive an authentication challenge from an authentication server, where the authentication challenge includes an indication of a first public key of a first keypair, a first signature of a first private key of the first keypair, and one or more second signatures of one or more second private keys of one or more second keypairs, determine whether the first public key is a trusted key that is pinned by the client device, determine, based on determining that the first public key is not the trusted key that is pinned by the client device, whether at least one signature of the one or more second signatures of the one or more second private keys can be validated by the trusted key pinned by the client device, and validate the authentication challenge based on determining that the at least one signature of the one or more second signatures of the one or more second private keys can be validated by the trusted key.

In some examples of the method, client devices, and non-transitory computer-readable medium described herein, the one or more second signatures of the one or more second private keys include a set of multiple second signatures of a set of multiple second private keys.

Some examples of the method, client devices, and non-transitory computer-readable medium described herein may further include operations, features, means, or instructions for validating, via the first public key of the first keypair, the first signature of the first private key, where determining whether the first public key may be the trusted key may be based on validating the first signature.

Some examples of the method, client devices, and non-transitory computer-readable medium described herein may further include operations, features, means, or instructions for validating via the trusted key pinned by the client device, the at least one signature of the one or more second signatures of the one or more second private keys, where validating the authentication challenge may be further based on validating the at least one signature.

Some examples of the method, client devices, and non-transitory computer-readable medium described herein may further include operations, features, means, or instructions for receiving a second authentication challenge from the authentication server including an indication of a third public key of a third keypair, a third signature of a third private key of the third keypair, and one or more fourth signatures of one or more fourth private keys of one or more fourth keypairs, determining, based on determining that the third public key may be not the trusted key that may be pinned by the client device, whether at least one signature of the one or more fourth signatures of the one or more fourth private keys can be validated by the trusted key pinned by the client device, and rejecting the authentication challenge based on determining that the at least one signature of the one or more fourth signatures of the one or more fourth private keys may be not validated by the trusted key.

Some examples of the method, client devices, and non-transitory computer-readable medium described herein may further include operations, features, means, or instructions for pinning the trusted key during installation of an application associated with the authentication server.

In some examples of the method, client devices, and non-transitory computer-readable medium described herein, the authentication challenge further includes one or more third signatures corresponding to respective string values of the first public key signed via each private key of the one or more second private keys.

Some examples of the method, client devices, and non-transitory computer-readable medium described herein may further include operations, features, means, or instructions for retrieving, based on determining that the first public key may be not the trusted key that may be pinned by the client device, a resource including an indication of at least the trusted key that may be pinned by the client device, where determining whether the at least one signature of the one or more second signatures of the one or more second private keys can be validated may be based on the resource.

In some examples of the method, client devices, and non-transitory computer-readable medium described herein, the resource includes a signature of the trusted key signed by a third private key of a third keypair, the third keypair including a third public key used by the authentication server prior to a second public key.

In some examples of the method, client devices, and non-transitory computer-readable medium described herein, the first keypair includes a first public key currently used by the authentication server and the one or more second keypairs include one or more second public keys used by the authentication server prior to the first public key.

BRIEF DESCRIPTION OF THE DRAWINGS

FIGS. 8 and 9 show flowcharts illustrating methods that support server verification via key pinning in accordance with aspects of the present disclosure.

DETAILED DESCRIPTION

Figure 1:
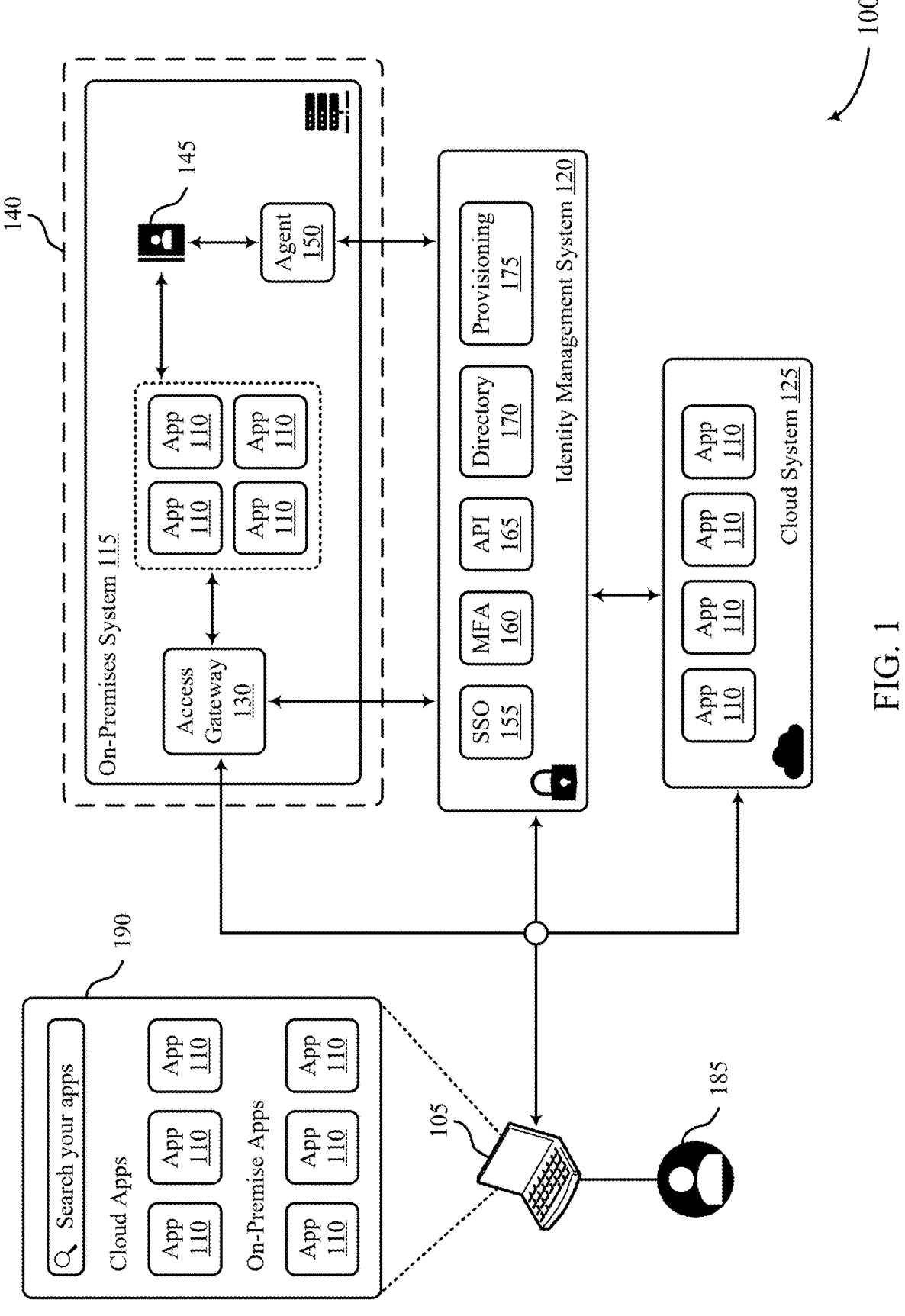
FIGS. 1 and 2 show examples of computing systems that support server verification via key pinning in accordance with aspects of the present disclosure.

In some computing systems, a client may communicate with a server via a transport layer security (TLS) connection.

For example, the client and server may communicate according to a TLS protocol in which the client and server may establish a trusted connection via a handshake procedure. The handshake procedure may include a request by the client to establish a secure connection and identification of the server via a digital certificate. The digital certificate may indicate a certificate authority (CA), such as a root-level CA, which issued the certificate, an indication of a public key of the server (e.g., a signature), or both. For example, the digital certificate may include a signature of the public key (e.g., generated by a private key of a keypair, the keypair including the public key and the private key) such that the digital certificate may be identified as modified or tampered with. That is, the client may verify a validity of the digital certificate by verifying the signature of the public key using the public key of the server.

In some cases, an attacker may replace the CA with a new CA (e.g., a new root-level CA) in a certificate injection attack. For example, the new CA of the attacker may be used by a decrypting proxy (e.g., a decrypting hypertext transfer protocol secure (HTTPS)) to decrypt, read, and re-encrypt data exchanged between the client and the server. The intercepted data may be used to perform a man-in-the-middle or person-in-the-middle attack in which data exchanged between the client and the server is modified, a replay attack in which a request sent by the client is reused by an attacker to obtain information from the server, or both. As an example, the attacker may replace the CA with the new CA via installation of a virtual private network (VPN) service by the client.

In such cases, the client may not identify (e.g., determine) that the root certificate has been replaced. For example, because client may (e.g., unknowingly) grant permissions to the attacker (e.g., for installation of the VPN service, access to a public Wi-Fi network, etc.), the root certificate injected by the attacker may be identified as trusted. In some cases, to prevent certificate injection attacks, the client may pin one or more keys. For example, the client may be configured with a list of trusted keys during installation of an application supported by the server or the client may intercept and perform custom verification on authentication challenge responses at runtime.

The client may verify signatures of public keys included in digital certificates and may determine whether the digital certificate was generated by a party possessing a pinned key of the one or more pinned keys. For example, if the client verifies that a signature of a public key included in a digital certificate via a public key pinned by the client, the client may accept the digital certificate and communicate via the server. Alternatively, the client may fail to verify the signature of a public key included in the digital certificate via the public key pinned by the client, the client may reject the digital certificate and identify a connection with the server as unsecure. However, servers may rotate keys. That is, a server may replace a keypair having established trust with the client (e.g., via the handshake procedure) with a new keypair. The server may rotate keys to reduce a probability of key theft and to maintain security of data encrypted using keys of the server.

As described herein, the client may establish trust with the server and communicate securely by maintaining a chain of keys. For example, when the server rotates a key, the client may verify that the server is trusted via the chain of keys in an authentication challenge. That is, the server may provide, to the client, the authentication challenge including at least a current public key and a signature of the current private key corresponding to the current public key. Additionally, the authentication challenge may include a signature of the current public key by a previous private key. In other words, the authentication challenge may include a reference to a previously used key of the server, where the reference allows the client to verify that the server possesses the previously used key. For example, the client may have pinned the previously used key. In such examples, the client may use the pinned key to validate the signature of the current public key by the previous private key. Based on validating the signature of the current public key by the previous public key, the client may validate the authentication challenge. The authentication challenge may include multiple references to previously used keys of the authentication server. For example, the authentication challenge may include signatures of public keys by private keys used prior (e.g., immediately prior). The client may attempt to validate the signatures and either reject the authentication challenge or validate the authentication challenge based on determining that at least one of the signatures may be validated using a key pinned by the client (e.g., a trusted key).

By validating that the server possesses a trusted key via the chain of keys in the authentication challenge, the client may avoid attacks related to root certificate replacement while maintaining trust for a server after one or more key rotations. For example, according to techniques described herein, the client may be able to use key pinning without rejecting the server after a key rotation. That is, by receiving the authentication including the references to previously used keys, the client may identify the server as trusted, and an application associated with the server may avoid degradation to user experience, delayed access to the application, or both related to new application releases to support the rotated keys. Additionally, by including the chain of keys in the authentication challenge, techniques described herein may support authentication of the server by the client via the pinned key after multiple key rotations. Using pinned keys to establish trust at the client and rotating keys at the server may improve a level of security related to man-in-the-middle attacks, replay attacks, certificate injection attacks, or the like.

Aspects of the disclosure are initially described in the context of computing systems. Aspects of the disclosure are also described in the context of flow diagrams and process flows. Aspects of the disclosure are further illustrated by and described with reference to apparatus diagrams, system diagrams, and flowcharts that relate to server verification via key pinning.

FIG. 1 illustrates an example of a computing system 100 that supports server verification via key pinning in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

The identity management system 120 may support server verification via key pinning. For example, the identity management system 120 may support an authentication server in communication with a client, where the authentication server establishes trust with the client by including one or more references to previously used keys in an authentication challenge. For example, the client may receive the authentication challenge from the authentication server, where the authentication challenge includes an indication of a first public key of a first keypair, a first signature of a first private key of the first keypair, and one or more second signatures of a one or more second private keys of one or more second keypairs. The client may determine whether the first public key, which may be a current key of the authentication server, is trusted by the device. After determining that the first public key is not the trusted key, the client may determine whether at least one signature of the one or more second signatures may be validated using the trusted key. If at least one signature of the one or more second signatures may be validated by the trusted key, the client may validate the authentication challenge.

Figure 2:
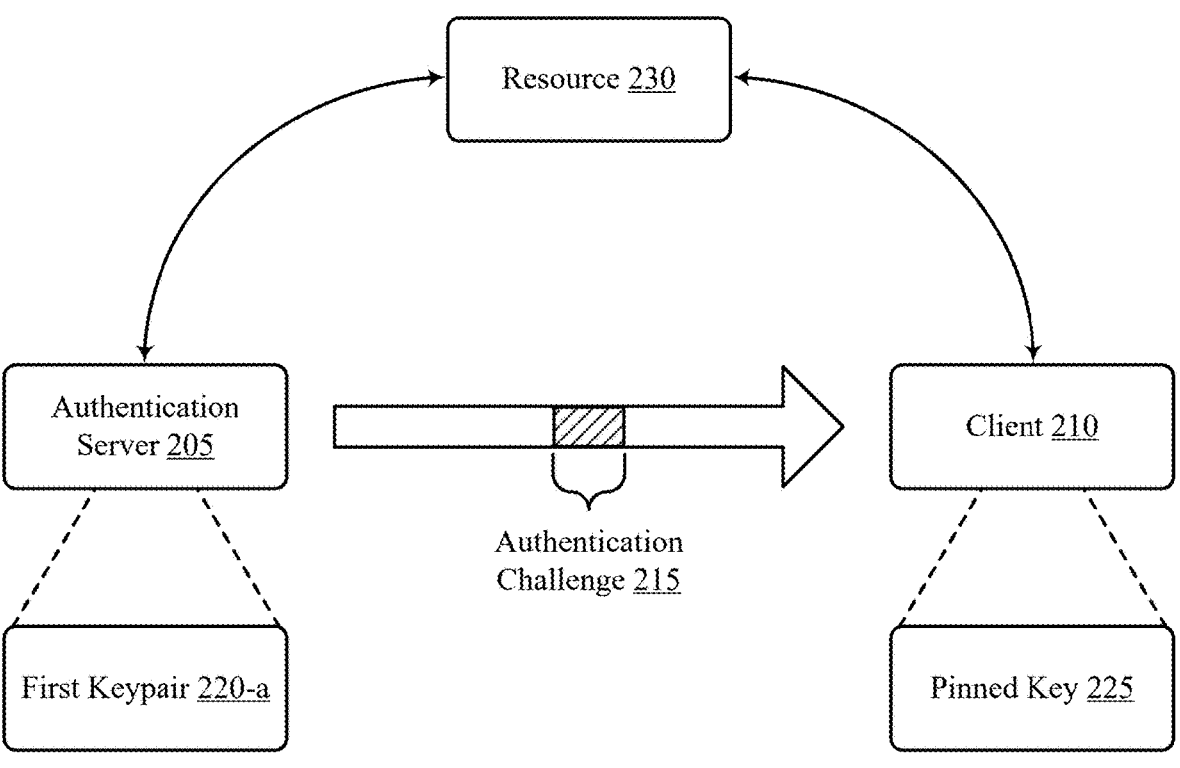

FIG. 2 shows an example of a computing system 200 that supports server verification via key pinning in accordance with aspects of the present disclosure. In some examples, the computing system 200 may implement or be implemented by aspects of the computing system 100. For example, the computing system 200 may include an authentication server 205, which may be an example of a server of the identity management system 120 as described with reference to FIG. 1.

The authentication server 205 and the client 210 may exchange one or more messages to establish trust prior to establishing a connection, such as a TLS connection. For example, the authentication server 205 may transmit an authentication challenge 215 to the client 210. The authentication challenge 215 may include a digital certificate including a signature of a currently used public key of the authentication server 205. That is, the digital certificate may include a signature of a public key of a keypair 220-$a$ of the authentication server 205, where the signature is generated via a private key of the keypair 220-$a$. In other words, in the example of FIG. 2, the keypair 220-$a$ may represent a keypair currently in use by the authentication server 205.

The client 210 may determine whether the authentication challenge 215 matches a pinned key 225 at the client 210. In examples in which the first public key is the pinned key 225 at the client 210, the client 210 may determine that the authentication challenge 215 corresponds to the pinned key 225 and validate the authentication server 205. Alternatively, in examples in which the first public key is not the pinned key 225 at the client 210, the client 210 may retrieve a resource 230. The resource 230 may be an example of a JavaScript Object Notation (JSON) file. The resource 230 may include a string or chain of keys of the authentication server 205. As an example, the authentication server 205 may have two previously used keys, and the resource 230 may be as follows:

```
[
    // Key #1
    {
        "publicKey": "-----BEGIN PUBLIC KEY-----\n . . . ",
        "signatures": {
            // Key 1 signed by Key 1
            "current": "{Base64 signature of the public key, using its private key}"
        }
    },
    // Key #2
    {
        "publicKey": "-----BEGIN PUBLIC KEY-----\n.",
        "signatures": {
            // Key 2 signed by Key 2
            "current": "{Base64 signature of the public key, using its private key}",
            // // Key 2 signed by Key 1
            "previous": "{Base64 signature of the public key, signed by the previous key}"
        }
    },
    // Key #3
    {
        "publicKey": "-----BEGIN PUBLIC KEY-----\n.",
        "signatures": {
            // Key 3 signed by Key 3
            "current": "{Base64 signature of the public key, using its private key}",
            // Key 3 signed by Key 2
            "previous": "{Base64 signature of the public key, signed by the previous key}"
        }
    }
```

-continued

```
    }
]
```

In other words, the resource 230 may include the first public key, a signature of the first public key via the first private key of the keypair 220-*a*; a second public key, a signature of the second public key via the second private key, a signature of the second public key via the first private key; a third public key, a signature of the third private key via the third private key, and a signature of the third public key via the second private key. For example, the resource 230 may include, for each key used by the authentication server 205, a public key (e.g., a string value of the public key), a signature of the public key via a corresponding private key (e.g., of a first keypair including the public key), and a signature of the public key via a private key used prior (e.g., of a second keypair replaced by the first keypair in a key rotation). A first key used by the server, such as Key 1 in the above example, may not include the signature of the public key via the private key used prior, as no key may have been used prior. The resource 230 may include the signatures of the public key via a private key used prior such that the authentication server 205 may demonstrate possession of the keypair used prior. By including signatures which link the current keypair to a previously used keypair, the authentication server 205 may improve a level of security. For example, an attacker attempting to impersonate the authentication server 205 may be required to obtain both the current keypair and a previously used keypair in order to replicate the signatures included in the resource 230.

The client 210 may validate signatures included in the resource 230 to determine whether the resource 230 includes a trusted key and to determine whether the resource 230 includes the key included in the authentication challenge 215. For example, the client 210 may verify signatures iteratively from an oldest key (e.g., and associated signatures) to newest key (e.g., and associated signatures). In the example above, the first keypair (e.g., Key 1) may represent an oldest keypair used by the authentication server 205, while the third keypair (e.g., Key 3) may represent a current key (e.g., of the keypair 220) of the authentication server 205. Accordingly, the client 210 may attempt to verify the signature of the first private key. That is, the client 210 may determine whether the signature of the first public key using the first private key may be validated using the indicated first public key. The client 210 may reject the authentication challenge 215 based on failing to validate the signature. Additionally, the client 210 may determine whether the first public key corresponds to the pinned key 225 or the public key included in the authentication challenge 215. In examples in which the client 210 determines that the first public key corresponds to the pinned key 225 and that the signature may be validated via the first public key (e.g., the pinned key 225), the client 210 may determine that the chain included in the resource 230 is trusted. The client 210 may continue attempting to verify the signatures of the resource 230 until the public key included in the authentication challenge 215 is identified.

After verifying the signature of the first private key, the client 210 may verify signatures associated with the second keypair. For example, the client 210 may determine whether the signature of the second public key using the second private key may be validated using the indicated second public key. Additionally, the client 210 may determine whether the signature of the second public key using the previous private key, the first private key, may be validated using the first public key. In examples in which one or more of the signatures may not be validated, the client 210 may reject the authentication challenge 215. The client 210 may determine whether the second public key corresponds to the pinned key 225 or the public key included in the authentication challenge 215. If the second public key corresponds to the pinned key 225, the client 210 may determine that the chain included in the resource 230 is trusted.

After verifying the signature of the second private key, the client 210 may verify signatures associated with the third keypair. For example, the client 210 may determine whether the signature of the third public key using the third private key may be validated using the indicated third public key. Additionally, the client 210 may determine whether the signature of the third public key using the previous private key, the second private key, may be validated using the second public key. In examples in which one or more of the signatures may not be validated, the client 210 may reject the authentication challenge 215. The client 210 may determine whether the third public key corresponds to the pinned key 225 or the public key included in the authentication challenge 215. If the third public key corresponds to the pinned key 225, the client 210 may determine that the chain included in the resource 230 is trusted. If the third public key corresponds to the public key included in the authentication challenge 215, the client 210 may validate or reject the authentication challenge 215 based on whether the chain included in the resource 230 was identified as trusted. While the example described with reference to FIG. 2 includes three keys used by the authentication server 205, it may be understood that the resource 230 may include one or more signatures of less than three or more than three keys. That is, the authentication server 205 may rotate keys fewer than three or more than three times, and the client may perform operations described with reference to FIG. 2 for less than or more than three keys.

In other words, the client 210 may reject the authentication challenge 215 based on failing to identify the pinned key 225 in the resource 230 prior to identifying the key included in the authentication challenge 215. Or, the client 210 may verify the authentication challenge 215 based on identifying the pinned key 225 in the resource 230 prior to identifying the key included in the authentication challenge.

Figure 3:
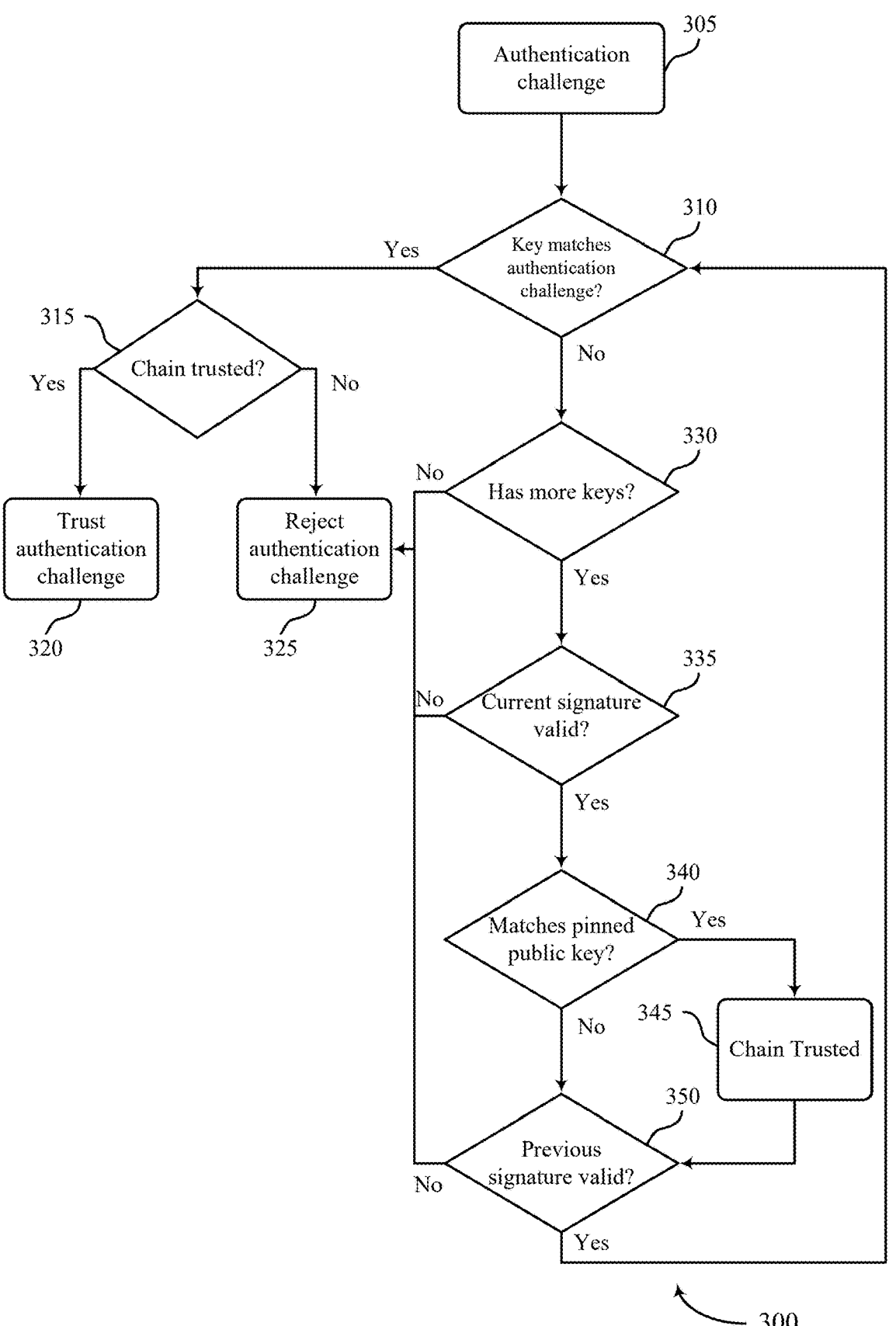
FIG. 3 shows an example of a flow diagram that supports server verification via key pinning in accordance with aspects of the present disclosure.

FIG. 3 shows an example of a flow diagram 300 that supports server verification via key pinning in accordance with aspects of the present disclosure. In some examples, the flow diagram 300 may implement aspects of the computing system 100, the computing system 200, or both. The flow diagram 300 may illustrate operations at a client, which may be an example of the client 210 as described with reference to FIG. 2. In the following description of the flow diagram 300, the operations performed may be performed in different orders or at different times than shown. Additionally, or alternatively, some operations may be omitted from the flow diagram 300 and other operations may be added to the flow diagram 300.

A client may perform one or more operations in response to receiving an authentication challenge from a server. For example, the client may receive the authentication challenge at 305 during establishment of a connection (e.g., a TLS connection) with the server. In response to receiving the authentication challenge at 305, the client may determine whether to trust or reject the authentication challenge in accordance with one or more operations described herein.

At 310, the client may determine whether a key matches the authentication challenge. For example, the client may determine whether a key pinned by the client matches a key supplied by the server. The authentication challenge may include an indication of a public key of a keypair of the server. For example, the authentication challenge may include a public key of the keypair and a signature of a private key of the keypair, where the client may validate the signature of the private key via the public key. That is, the client may verify whether the authentication challenge was tampered with by verifying the signature included in the authentication challenge via the public key. In some examples, the client may reject the authentication challenge (e.g., immediately) at 325 based on failing to validate the signature of the private key via the public key included in the authentication challenge received at 305. For example, the client may determine whether the pinned key matches the key included in the authentication challenge after or based on validating the signature of the private key via the public key included in the authentication challenge.

In some examples, the public key included in the authentication challenge may match the key pinned by the client. In such examples, the client may determine whether a chain is trusted at 315. In the example of the public key included in the authentication challenge matching the pinned key, the client may trust the authentication challenge at 320 without retrieving a resource including the chain. That is, the client may skip the operation at 315 based on determining that the key included in the authentication challenge corresponds to the pinned key.

In alternative examples, the public key included in the authentication challenge may not match the key pinned by the client. That is, the signature of the private key included in the authentication challenge may not be validated via the key pinned by the client. For example, the server may rotate one or more keys such that a key pinned by the client is not in use by the server. In such examples, the client may retrieve a resource including a chain of keys. For example, the client may retrieve the resource 230 as described with reference to FIG. 2. The client may iterate on the operations at 310 through 350 for each key included in the resource. For example, the client may perform the operations at 310 through 350 for respective keys included in the resource in an order of an oldest key to a newest key.

At 330, the client may determine whether the server has more keys. That is, the client may determine whether the server has more keys than have been evaluated by the client. In the example of determining whether the server has more keys after retrieving the resource, the client may identify an oldest key included in the resource. Alternatively, in the example of determining whether the server has more keys after evaluating one or more keys included in the resource, the client may identify a key following the one or more evaluated keys. The client may reject the authentication challenge at 325 based on determining that the server does not have more keys. That is, the client may reject the authentication challenge based on failing to identify a new key to be evaluated in the resource when the pinned key in the chain of keys of the resource has not yet been identified. In other words, the client may reject the authentication challenge based on failing to identify the pinned key in the chain of keys. Alternatively, the client may determine that the server has more keys. That is, the client may determine that the server has at least one key that has not yet been evaluated by the client.

At 335, the client may determine whether a current signature is valid. For example, the resource may include, for each key, a signature of a public key via a corresponding private key (e.g., of a keypair). Determining whether the current signature is valid may include validating the signature via the public key of the keypair. The client may reject the authentication challenge at 325 based on determining that the current signature is invalid. For example, the client may reject the authentication challenge based on failing to verify the signature of the public key via the private key via the public key included in the resource (e.g., for a respective key). Alternatively, the client may determine that the current signature is valid.

At 350, the client may determine whether the key matches the pinned public key. For example, the client may determine, for each respective key included in the resource, whether the key corresponds to a key pinned by the client. The client may generate a flag indicating that the chain is trusted at 345 based on determining that the key corresponds to the pinned key (e.g., or one of multiple pinned keys). For example, the client may store the flag indicating that the chain is trusted at 345 and proceed to validate remaining keys of the chain to determine whether each signature included in the chain is valid (e.g., regardless of having identified the pinned key in the chain).

After determining that the key does not match the pinned key at 340 or generating the flag indicating that the chain is trusted at 345, the client may determine whether a previous signature is valid. For example, the resource may include, for each key, a signature of a public key via a previous private key (e.g., of a previous keypair). Determining whether the previous signature is valid may include validating the signature via the public key of the previous keypair. In examples in which the client is evaluating an oldest key included in the resource, the client may skip the operation at 350. That is, an oldest key included in the resource may not include a signature of a previous private key as there may not be a key prior to the oldest key. The client may reject the authentication challenge at 325 based on determining that the previous signature is invalid. For example, the client may reject the authentication challenge based on failing to verify the signature of the public key via the previous private key via the previous public key included in the resource (e.g., for a respective key). Alternatively, the client may determine that the previous signature is valid.

At 310, the client may determine whether a currently evaluated key (e.g., evaluated at 335 through 350) matches the authentication challenge. For example, the client may determine whether a presently used key by the server (e.g., used in the authentication challenge) matches the currently evaluated key. The client may evaluate keys included in the resource up to (e.g., in order from oldest to newest) the key used in the authentication challenge. For example, the client may determine whether the chain is trusted at 315 based on determining that the key matches the authentication challenge or repeat the operations at 330 through 350 based on determining that the key does not match the authentication challenge.

At 315, the client may determine whether a chain is trusted. For example, the client may determine whether at least one key included in the chain corresponds to the key pinned by the client. In other words, the client may check that the flag from 345 was generated for at least one key evaluated by the client. That is, after evaluating the keys included in the resource up to the key included in the authentication challenge, the client may determine whether at least one of the evaluated keys corresponds to the pinned key (e.g., of one or more pinned keys). At 320, the client may trust the authentication challenge based on determining that at least one key included in the chain corresponds to the key pinned by the client. Alternatively, the client may reject the authentication challenge at 325 based on failing to determine that at least one key included in the chain corresponds to the key pinned by the client.

Figure 4:
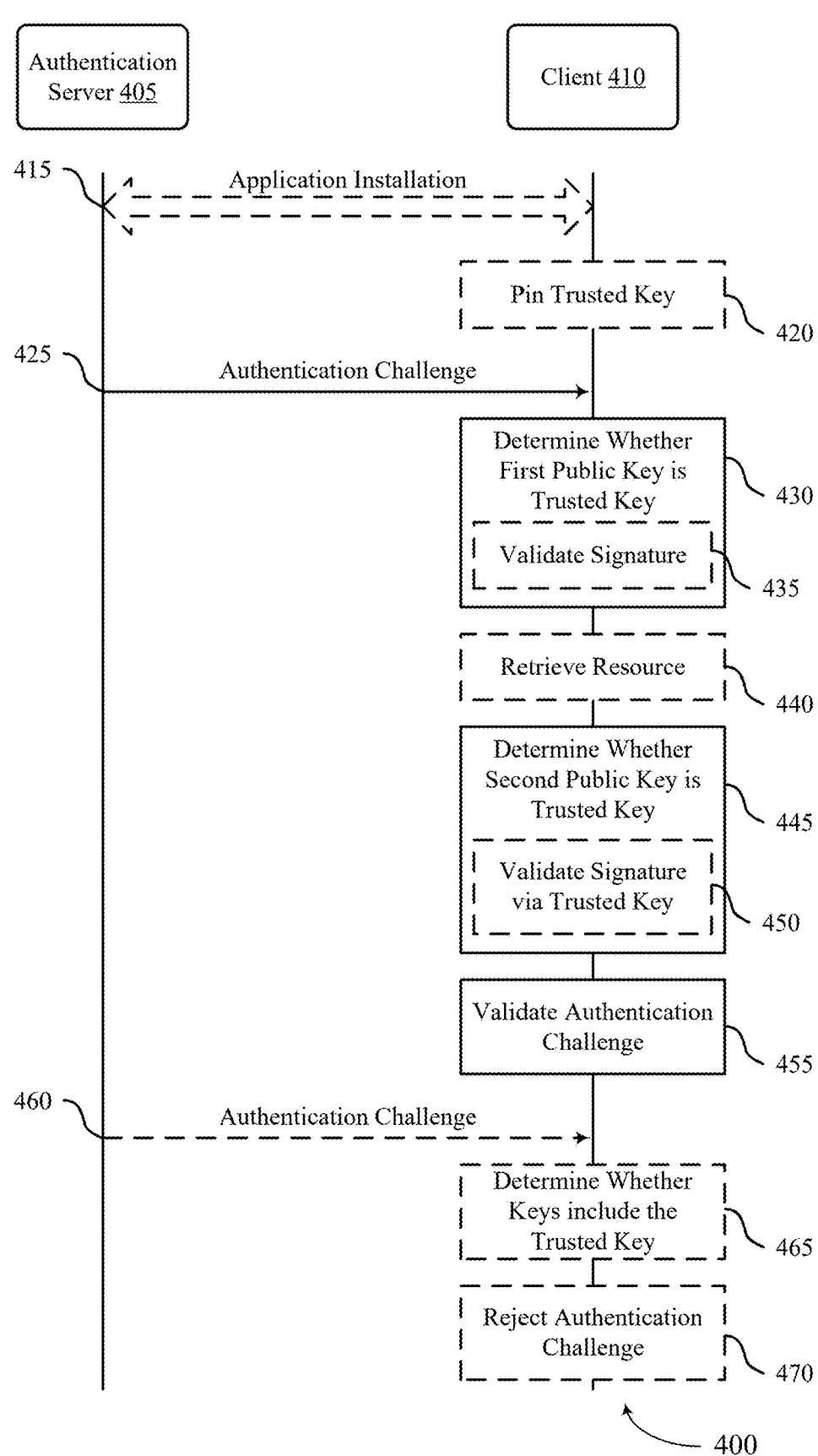
FIG. 4 shows an example of a process flow that supports server verification via key pinning in accordance with aspects of the present disclosure.

FIG. 4 shows an example of a process flow 400 that supports server verification via key pinning in accordance with aspects of the present disclosure. In some examples, the process flow 400 may implement aspects of the computing system 100, the computing system 200, the flow diagram 300, or any combination thereof. The process flow 400 may illustrate operations of authentication server 405 and a client 410, which may be examples of corresponding devices as described with reference to FIG. 2.

In the following description of the process flow 400, the operations performed at the authentication server 405 and the client 410 may be performed in different orders or at different times than shown. While the operations of the process flow 400 are illustrated and described as being performed by the authentication server 405 and the client 410, the operations described herein may be performed at one or more other devices or systems. Additionally, or alternatively, some operations may be omitted from the process flow 400 and other operations may be added to the process flow 400.

At 415, the authentication server 405 and the client 410 may perform application installation. During installation of the application, at 420, the client 410 may pin a trusted key. In other words, the client 410 may pin the trusted key during installation of an application associated with the authentication server 405.

At 425, the client 410 may receive an authentication challenge from the authentication server 405. For example, the client 410 may receive an authentication challenge from the authentication server 405. The authentication challenge may include an indication of a first public key of a first keypair, a first signature of a first private key of the first keypair, and one or more second signatures of one or more second private keys of one or more second keypairs. The one or more second signatures of the one or more second private keys may include multiple second signatures of a multiple second private keys. The authentication challenge may include a string value or hash value of the first public key, a signature of the first public key via the first private key of the first keypair, and a reference to a resource. The resource may include string values or hash values of one or more second public keys of one or more second keypairs and the one or more second signatures of the one or more second public keys via the one or more second private keys. In some examples, the resource may include signatures of respective public keys of the one or more second public keys via a preceding (e.g., older) private key. For example, the authentication challenge may include (e.g., an indication of) one or more third signatures corresponding to respective string values of the first public key (e.g., a new public key) signed via each private key of the one or more second private keys (e.g., old private keys). In other words, the authentication challenge may include an indication of a resource including a key chain or nested key chain.

At 430, the client 410 may determine whether the first public key is the trusted key. For example, the client 410 may determine whether the first public key is a trusted key that is pinned by the client device. The client 410 may compare a string or hash value of the first public key to a string or hash value of the pinned key. In examples in which the first public key is the trusted key, the client 410 may validate the authentication challenge. Alternatively, the client 410 may retrieve the resource indicated by the authentication challenge.

At 435, the client 410 may validate a signature. For example, the client 410 may validate, via the first public key of the first keypair, the first signature of the first private key. Determining whether the first public key is the trusted key at 430 may be based on validating the first signature. For example, the client 410 may not trust the authentication challenge based on the first signature being invalid. In other words, the client 410 may reject the authentication challenge based on failing to validate the first signature via the first public key.

At 440, the client 410 may retrieve a resource. For example, the client 410 may retrieve, based on determining that the first public key is not the trusted key that is pinned by the client 410, a resource including an indication of at least the trusted key that is pinned by the client 410. In such examples, determining whether at least one signature of the one or more second signatures of the one or more second private keys can be validated may be based on the resource retrieved at 440. The resource may include a signature of the trusted key signed by a third private key of a third keypair, the third keypair being a third public key used by the authentication server prior to a second public key. In other words, the resource may include a signature of the second public key (e.g., the trusted private key) by the third private key, where the authentication server 405 rotated from using the second keypair to the third keypair (e.g., prior to rotating to the first keypair). That is, the first keypair may include a first public key currently used by the authentication server 405, and the one or more second keypairs may include one or more second public keys used by the authentication server 405 prior to the first public key.

At 445, the client 410 may determine whether the second public key is the trusted key. For example, the client 410 may determine, based on determining that the first public key is not the trusted key that is pinned by the client 410, whether at least one signature of the one or more second signatures of the one or more second private keys can be validated by the trusted key pinned by the client 410.

At 450, the client 410 may validate a signature via the trusted key. For example, the client 410 may validate, via the trusted key pinned by the client 410, at least one signature of the one or more second signatures of the one or more second private keys. That is, the client 410 may determine that the resource includes the trusted key pinned by the client 410 based on validating at least one signature in the resource using the pinned key. In some examples, the client 410 may validate the authentication challenge based on validating the at least one signature.

At 455, the client 410 may validate the authentication challenge. For example, the client 410 may validate the authentication challenge based on determining that at least one signature of the one or more second signatures of the one or more second private keys can be validated by the trusted key.

At 460, the client 410 may receive an authentication challenge (e.g., a second authentication challenge) from the authentication server 405. For example, the client 410 may receive a second authentication challenge from the authentication server 405 including an indication of a third public key of a third keypair, a third signature of a third private key of the third keypair, and one or more fourth signatures of one or more fourth private keys of one or more fourth keypairs.

At 465, the client 410 may determine whether the keys include the trusted key. For example, the client 410 may determine, based on determining that the third public key is not the trusted key that is pinned by the client 410, whether at least one signature of the one or more fourth signatures of the one or more fourth private keys can be validated by the trusted key pinned by the client 410. At 470, the client 410 may reject the authentication challenge. For example, the client 410 may reject the authentication challenge based on determining that at least one signature of the one or more fourth signatures of the one or more fourth private keys is not validated by the trusted key.

Figure 5:
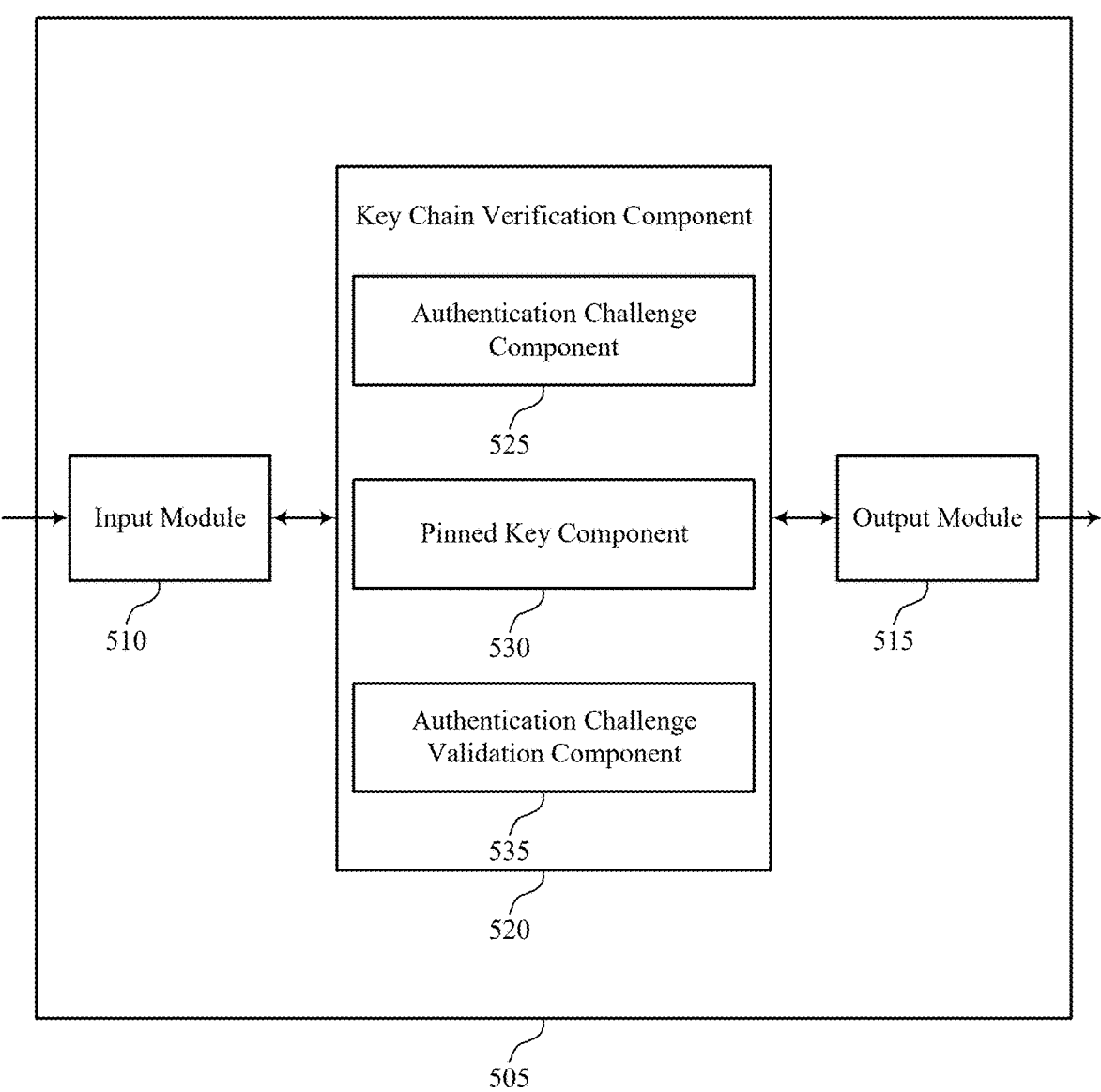
FIG. 5 shows a block diagram of an apparatus that supports server verification via key pinning in accordance with aspects of the present disclosure.

FIG. 5 shows a block diagram 500 of a device 505 that supports server verification via key pinning in accordance with aspects of the present disclosure. The device 505 may include an input module 510, an output module 515, and a key chain verification component 520. The device 505, or one or more components of the device 505 (e.g., the input module 510, the output module 515, the key chain verification component 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the key chain verification component 520 to support server verification via key pinning. In some cases, the input module 510 may be a component of an input/output (I/O) controller 710 as described with reference to FIG. 7.

The output module 515 may manage output signals for the device 505. For example, the output module 515 may receive signals from other components of the device 505, such as the key chain verification component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the key chain verification component 520 may include an authentication challenge component 525, a pinned key component 530, an authentication challenge validation component 535, or any combination thereof. In some examples, the key chain verification component 520, or various components thereof, may be configured to perform various operations (e.g., receiving, monitoring, transmitting) using or otherwise in cooperation with the input module 510, the output module 515, or both. For example, the key chain verification component 520 may receive information from the input module 510, send information to the output module 515, or be integrated in combination with the input module 510, the output module 515, or both to receive information, transmit information, or perform various other operations as described herein.

The key chain verification component 520 may support key pinning in accordance with examples as disclosed herein. The authentication challenge component 525 may be configured to support receiving an authentication challenge from an authentication server, where the authentication challenge includes an indication of a first public key of a first keypair, a first signature of a first private key of the first keypair, and one or more second signatures of one or more second private keys of one or more second keypairs. The pinned key component 530 may be configured to support determining whether the first public key is a trusted key that is pinned by the client device. The pinned key component 530 may be configured to support determining, based on determining that the first public key is not the trusted key that is pinned by the client device, whether at least one signature of the one or more second signatures of the one or more second private keys can be validated by the trusted key pinned by the client device. The authentication challenge validation component 535 may be configured to support validating the authentication challenge based on determining that the at least one signature of the one or more second signatures of the one or more second private keys can be validated by the trusted key.

Figure 6:
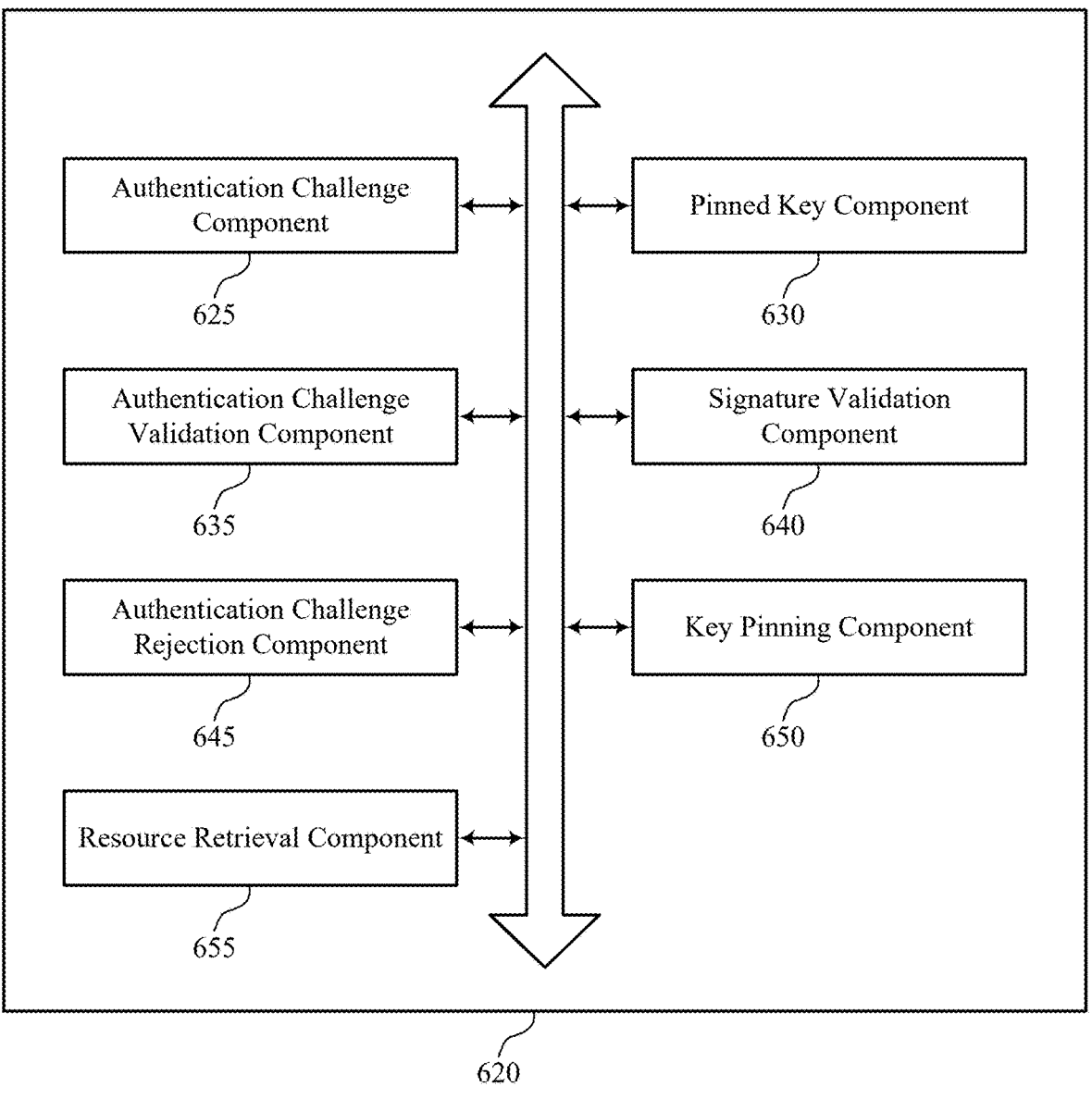
FIG. 6 shows a block diagram of a key chain verification component that supports server verification via key pinning in accordance with aspects of the present disclosure.

FIG. 6 shows a block diagram 600 of a key chain verification component 620 that supports server verification via key pinning in accordance with aspects of the present disclosure. The key chain verification component 620 may be an example of aspects of a key chain verification component or a key chain verification component 520, or both, as described herein. The key chain verification component 620, or various components thereof, may be an example of means for performing various aspects of server verification via key pinning as described herein. For example, the key chain verification component 620 may include an authentication challenge component 625, a pinned key component 630, an authentication challenge validation component 635, a signature validation component 640, an authentication challenge rejection component 645, a key pinning component 650, a resource retrieval component 655, or any combination thereof. Each of these components, or components of subcomponents thereof (e.g., one or more processors, one or more memories), may communicate, directly or indirectly, with one another (e.g., via one or more buses).

The key chain verification component 620 may support key pinning in accordance with examples as disclosed herein. The authentication challenge component 625 may be configured to support receiving an authentication challenge from an authentication server, where the authentication challenge includes an indication of a first public key of a first keypair, a first signature of a first private key of the first keypair, and one or more second signatures of one or more second private keys of one or more second keypairs. The pinned key component 630 may be configured to support determining whether the first public key is a trusted key that is pinned by the client device. In some examples, the pinned key component 630 may be configured to support determining, based on determining that the first public key is not the trusted key that is pinned by the client device, whether at least one signature of the one or more second signatures of the one or more second private keys can be validated by the trusted key pinned by the client device. The authentication challenge validation component 635 may be configured to support validating the authentication challenge based on determining that the at least one signature of the one or more second signatures of the one or more second private keys can be validated by the trusted key.

In some examples, the one or more second signatures of the one or more second private keys include a set of multiple second signatures of a set of multiple second private keys.

In some examples, the signature validation component 640 may be configured to support validating, via the first public key of the first keypair, the first signature of the first private key, where determining whether the first public key is the trusted key is based on validating the first signature.

In some examples, the signature validation component 640 may be configured to support validating via the trusted key pinned by the client device, the at least one signature of the one or more second signatures of the one or more second private keys, where validating the authentication challenge is further based on validating the at least one signature.

In some examples, the authentication challenge component 625 may be configured to support receiving a second authentication challenge from the authentication server including an indication of a third public key of a third keypair, a third signature of a third private key of the third keypair, and one or more fourth signatures of one or more fourth private keys of one or more fourth keypairs. In some examples, the pinned key component 630 may be configured to support determining, based on determining that the third public key is not the trusted key that is pinned by the client device, whether at least one signature of the one or more fourth signatures of the one or more fourth private keys can be validated by the trusted key pinned by the client device. In some examples, the authentication challenge rejection component 645 may be configured to support rejecting the authentication challenge based on determining that the at least one signature of the one or more fourth signatures of the one or more fourth private keys is not validated by the trusted key.

In some examples, the key pinning component 650 may be configured to support pinning the trusted key during installation of an application associated with the authentication server.

In some examples, the authentication challenge further includes one or more third signatures corresponding to respective string values of the first public key signed via each private key of the one or more second private keys.

In some examples, the resource retrieval component 655 may be configured to support retrieving, based on determining that the first public key is not the trusted key that is pinned by the client device, a resource including an indication of at least the trusted key that is pinned by the client device, where determining whether the at least one signature of the one or more second signatures of the one or more second private keys can be validated is based on the resource.

In some examples, the resource includes a signature of the trusted key signed by a third private key of a third keypair, the third keypair including a third public key used by the authentication server prior to a second public key.

In some examples, the first keypair includes a first public key currently used by the authentication server. In some examples, the one or more second keypairs include one or more second public keys used by the authentication server prior to the first public key.

Figure 7:
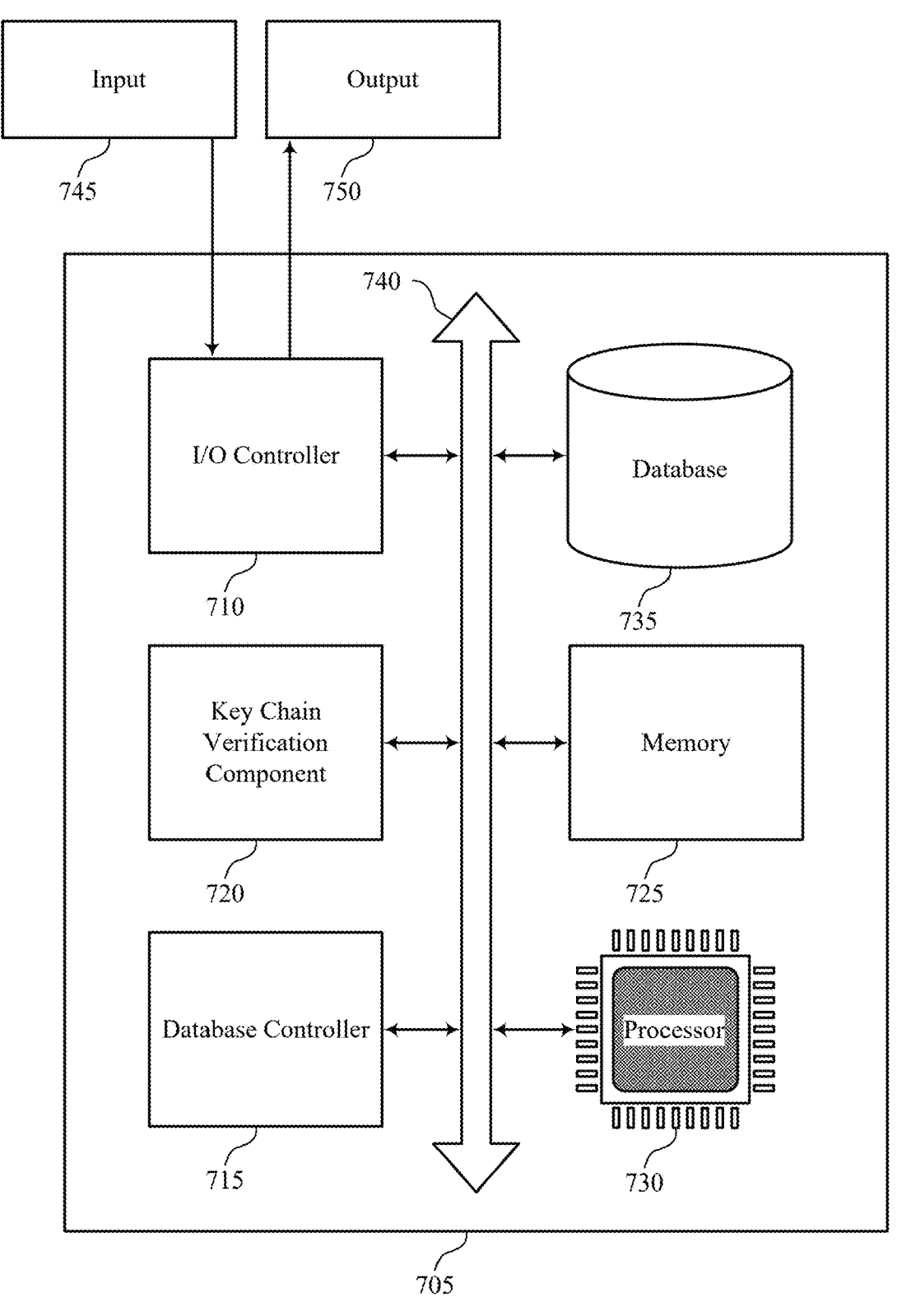
FIG. 7 shows a diagram of a system including a device that supports server verification via key pinning in accordance with aspects of the present disclosure.

FIG. 7 shows a diagram of a system 700 including a device 705 that supports server verification via key pinning in accordance with aspects of the present disclosure. The device 705 may be an example of or include components of a device 505 as described herein. The device 705 may include components for bi-directional voice and data communications including components for transmitting and receiving communications, such as a key chain verification component 720, an I/O controller, such as an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting server verification via key pinning). The processor 730 may be an example of a single processor or multiple processors. For example, the device 705 may include one or more processors 730.

The key chain verification component 720 may support key pinning in accordance with examples as disclosed herein. For example, the key chain verification component 720 may be configured to support receiving an authentication challenge from an authentication server, where the authentication challenge includes an indication of a first public key of a first keypair, a first signature of a first private key of the first keypair, and one or more second signatures of one or more second private keys of one or more second keypairs. The key chain verification component 720 may be configured to support determining whether the first public key is a trusted key that is pinned by the client device. The key chain verification component 720 may be configured to support determining, based on determining that the first public key is not the trusted key that is pinned by the client device, whether at least one signature of the one or more second signatures of the one or more second private keys can be validated by the trusted key pinned by the client device. The key chain verification component 720 may be configured to support validating the authentication challenge based on determining that the at least one signature of the one or more second signatures of the one or more second private keys can be validated by the trusted key.

By including or configuring the key chain verification component 720 in accordance with examples as described herein, the device 705 may support techniques for improved security related to key rotation at a server and prevention of one or more attack vectors related to a TLS connection, including man-in-the-middle attacks, certificate injection attacks, or the like.

FIG. 8 shows a flowchart illustrating a method 800 that supports server verification via key pinning in accordance with aspects of the present disclosure. The operations of the method 800 may be implemented by an Okta Device or its components as described herein. For example, the operations of the method 800 may be performed by an Okta Device as described with reference to FIGS. 1 through 7. In some examples, an Okta Device may execute a set of instructions to control the functional elements of the Okta Device to perform the described functions. Additionally, or alternatively, the Okta Device may perform aspects of the described functions using special-purpose hardware.

At 805, the method may include receiving an authentication challenge from an authentication server, where the authentication challenge includes an indication of a first public key of a first keypair, a first signature of a first private key of the first keypair, and one or more second signatures of one or more second private keys of one or more second keypairs. The operations of 805 may be performed in accordance with examples as disclosed herein. In some examples, aspects of the operations of 805 may be performed by an authentication challenge component 625 as described with reference to FIG. 6.

At 810, the method may include determining whether the first public key is a trusted key that is pinned by the client device. The operations of 810 may be performed in accordance with examples as disclosed herein. In some examples, aspects of the operations of 810 may be performed by a pinned key component 630 as described with reference to FIG. 6.

At 815, the method may include determining, based on determining that the first public key is not the trusted key that is pinned by the client device, whether at least one signature of the one or more second signatures of the one or more second private keys can be validated by the trusted key pinned by the client device. The operations of 815 may be performed in accordance with examples as disclosed herein. In some examples, aspects of the operations of 815 may be performed by a pinned key component 630 as described with reference to FIG. 6.

At 820, the method may include validating the authentication challenge based on determining that the at least one signature of the one or more second signatures of the one or more second private keys can be validated by the trusted key. The operations of 820 may be performed in accordance with examples as disclosed herein. In some examples, aspects of the operations of 820 may be performed by an authentication challenge validation component 635 as described with reference to FIG. 6.

FIG. 9 shows a flowchart illustrating a method 900 that supports server verification via key pinning in accordance with aspects of the present disclosure. The operations of the method 900 may be implemented by an Okta Device or its components as described herein. For example, the operations of the method 900 may be performed by an Okta Device as described with reference to FIGS. 1 through 7. In some examples, an Okta Device may execute a set of instructions to control the functional elements of the Okta Device to perform the described functions. Additionally, or alternatively, the Okta Device may perform aspects of the described functions using special-purpose hardware.

At 905, the method may include receiving an authentication challenge from an authentication server, where the authentication challenge includes an indication of a first public key of a first keypair, a first signature of a first private key of the first keypair, and one or more second signatures of one or more second private keys of one or more second keypairs. The operations of 905 may be performed in accordance with examples as disclosed herein. In some examples, aspects of the operations of 905 may be performed by an authentication challenge component 625 as described with reference to FIG. 6.

At 910, the method may include determining whether the first public key is a trusted key that is pinned by the client device. The operations of 910 may be performed in accordance with examples as disclosed herein. In some examples, aspects of the operations of 910 may be performed by a pinned key component 630 as described with reference to FIG. 6.

At 915, the method may include validating, via the first public key of the first keypair, the first signature of the first private key, where determining whether the first public key is the trusted key is based on validating the first signature. The operations of 915 may be performed in accordance with examples as disclosed herein. In some examples, aspects of the operations of 915 may be performed by a signature validation component 640 as described with reference to FIG. 6.

At 920, the method may include determining, based on determining that the first public key is not the trusted key that is pinned by the client device, whether at least one signature of the one or more second signatures of the one or more second private keys can be validated by the trusted key pinned by the client device. The operations of 920 may be performed in accordance with examples as disclosed herein. In some examples, aspects of the operations of 920 may be performed by a pinned key component 630 as described with reference to FIG. 6.

At 925, the method may include validating the authentication challenge based on determining that the at least one signature of the one or more second signatures of the one or more second private keys can be validated by the trusted key. The operations of 925 may be performed in accordance with examples as disclosed herein. In some examples, aspects of the operations of 925 may be performed by an authentication challenge validation component 635 as described with reference to FIG. 6.

The following provides an overview of aspects of the present disclosure:

Aspect 1: A computer-implemented method for key pinning at a client device, comprising: receiving an authentication challenge from an authentication server, wherein the authentication challenge comprises an indication of a first public key of a first keypair, a first signature of a first private key of the first keypair, and one or more second signatures of one or more second private keys of one or more second keypairs; determining whether the first public key is a trusted key that is pinned by the client device; determining, based at least in part on determining that the first public key is not the trusted key that is pinned by the client device, whether at least one signature of the one or more second signatures of the one or more second private keys can be validated by the trusted key pinned by the client device; and validating the authentication challenge based at least in part on determining that the at least one signature of the one or more second signatures of the one or more second private keys can be validated by the trusted key.

Aspect 2: The computer-implemented method of aspect 1, wherein the one or more second signatures of the one or more second private keys comprise a plurality of second signatures of a plurality of second private keys.

Aspect 3: The computer-implemented method of any of aspects 1 through 2, further comprising: validating, via the first public key of the first keypair, the first signature of the first private key, wherein determining whether the first public key is the trusted key is based at least in part on validating the first signature.

Aspect 4: The computer-implemented method of any of aspects 1 through 3, further comprising: validating via the trusted key pinned by the client device, the at least one signature of the one or more second signatures of the one or more second private keys, wherein validating the authentication challenge is further based at least in part on validating the at least one signature.

Aspect 5: The computer-implemented method of any of aspects 1 through 4, further comprising: receiving a second authentication challenge from the authentication server comprising an indication of a third public key of a third keypair, a third signature of a third private key of the third keypair, and one or more fourth signatures of one or more fourth private keys of one or more fourth keypairs; determining, based at least in part on determining that the third public key is not the trusted key that is pinned by the client device, whether at least one signature of the one or more fourth signatures of the one or more fourth private keys can be validated by the trusted key pinned by the client device; and rejecting the authentication challenge based at least in part on determining that the at least one signature of the one or more fourth signatures of the one or more fourth private keys is not validated by the trusted key.

Aspect 6: The computer-implemented method of any of aspects 1 through 5, further comprising: pinning the trusted key during installation of an application associated with the authentication server.

Aspect 7: The computer-implemented method of any of aspects 1 through 6, wherein the authentication challenge further comprises one or more third signatures corresponding to respective string values of the first public key signed via each private key of the one or more second private keys.

Aspect 8: The computer-implemented method of any of aspects 1 through 7, further comprising: retrieving, based at least in part on determining that the first public key is not the trusted key that is pinned by the client device, a resource comprising an indication of at least the trusted key that is pinned by the client device, wherein determining whether the at least one signature of the one or more second signatures of the one or more second private keys can be validated is based at least in part on the resource.

Aspect 9: The computer-implemented method of aspect 8, wherein the resource comprises a signature of the trusted key signed by a third private key of a third keypair, the third keypair comprising a third public key used by the authentication server prior to a second public key.

Aspect 10: The computer-implemented method of any of aspects 1 through 9, wherein the first keypair comprises a first public key currently used by the authentication server, and the one or more second keypairs comprise one or more second public keys used by the authentication server prior to the first public key.

Aspect 11: A client device for key pinning, comprising one or more memories storing processor-executable code, and one or more processors coupled with the one or more memories and individually or collectively operable to execute the processor-executable code to cause the client device to perform a method of any of aspects 1 through 10.

Aspect 12: A client device for key pinning, comprising at least one means for performing a method of any of aspects 1 through 10.

Aspect 13: A non-transitory computer-readable medium storing code for key pinning, the code comprising instructions executable by one or more processors to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for key pinning at a client device, comprising:

receiving an authentication challenge from an authentication server, wherein the authentication challenge comprises an indication of a first public key of a first keypair, a first signature of a first private key of the first keypair, and one or more second signatures of one or more second private keys of one or more second keypairs;

determining whether the first public key is a trusted key that is pinned by the client device;

determining, based at least in part on determining that the first public key is not the trusted key that is pinned by the client device, whether at least one signature of the one or more second signatures of the one or more second private keys can be validated by the trusted key pinned by the client device; and validating the authentication challenge based at least in part on determining that the at least one signature of the one or more second signatures of the one or more second private keys can be validated by the trusted key.

2. The computer-implemented method of claim 1, wherein the one or more second signatures of the one or more second private keys comprise a plurality of second signatures of a plurality of second private keys.

3. The computer-implemented method of claim 1, further comprising:

validating, via the first public key of the first keypair, the first signature of the first private key, wherein determining whether the first public key is the trusted key is based at least in part on validating the first signature.

4. The computer-implemented method of claim 1, further comprising:

validating via the trusted key pinned by the client device, the at least one signature of the one or more second signatures of the one or more second private keys, wherein validating the authentication challenge is further based at least in part on validating the at least one signature.

5. The computer-implemented method of claim 1, further comprising:

receiving a second authentication challenge from the authentication server comprising an indication of a third public key of a third keypair, a third signature of a third private key of the third keypair, and one or more fourth signatures of one or more fourth private keys of one or more fourth keypairs;

determining, based at least in part on determining that the third public key is not the trusted key that is pinned by the client device, whether at least one signature of the one or more fourth signatures of the one or more fourth private keys can be validated by the trusted key pinned by the client device; and rejecting the authentication challenge based at least in part on determining that the at least one signature of the one or more fourth signatures of the one or more fourth private keys is not validated by the trusted key.

6. The computer-implemented method of claim 1, further comprising:

pinning the trusted key during installation of an application associated with the authentication server.

7. The computer-implemented method of claim 1, wherein the authentication challenge further comprises one or more third signatures corresponding to respective string values of the first public key signed via each private key of the one or more second private keys.

8. The computer-implemented method of claim 1, further comprising:

retrieving, based at least in part on determining that the first public key is not the trusted key that is pinned by the client device, a resource comprising an indication of at least the trusted key that is pinned by the client device, wherein determining whether the at least one signature of the one or more second signatures of the one or more second private keys can be validated is based at least in part on the resource.

9. The computer-implemented method of claim 8, wherein the resource comprises a signature of the trusted key signed by a third private key of a third keypair, the third keypair comprising a third public key used by the authentication server prior to a second public key.

10. The computer-implemented method of claim 1, wherein:

the first keypair comprises a first public key currently used by the authentication server, and the one or more second keypairs comprise one or more second public keys used by the authentication server prior to the first public key.

11. A client device for key pinning, comprising:

one or more memories storing processor-executable code; and one or more processors coupled with the one or more memories and individually or collectively operable to execute the processor-executable code to cause the client device to:

receive an authentication challenge from an authentication server, wherein the authentication challenge comprises an indication of a first public key of a first keypair, a first signature of a first private key of the first keypair, and one or more second signatures of one or more second private keys of one or more second keypairs;

determine whether the first public key is a trusted key that is pinned by the client device;

determine, based at least in part on determining that the first public key is not the trusted key that is pinned by the client device, whether at least one signature of the one or more second signatures of the one or more second private keys can be validated by the trusted key pinned by the client device; and validate the authentication challenge based at least in part on determining that the at least one signature of the one or more second signatures of the one or more second private keys can be validated by the trusted key.

12. The client device of claim 11, wherein the one or more second signatures of the one or more second private keys comprise a plurality of second signatures of a plurality of second private keys.

13. The client device of claim 11, wherein the one or more processors are individually or collectively further operable to execute the processor-executable code to cause the client device to:

validate, via the first public key of the first keypair, the first signature of the first private key, wherein determining whether the first public key is the trusted key is based at least in part on validating the first signature.

14. The client device of claim 11, wherein the one or more processors are individually or collectively further operable to execute the processor-executable code to cause the client device to:

validate via the trusted key pinned by the client device, the at least one signature of the one or more second signatures of the one or more second private keys, wherein validating the authentication challenge is further based at least in part on validating the at least one signature.

15. The client device of claim 11, wherein the one or more processors are individually or collectively further operable to execute the processor-executable code to cause the client device to:

receive a second authentication challenge from the authentication server comprising an indication of a third public key of a third keypair, a third signature of a third private key of the third keypair, and one or more fourth signatures of one or more fourth private keys of one or more fourth keypairs;

determine, based at least in part on determining that the third public key is not the trusted key that is pinned by the client device, whether at least one signature of the one or more fourth signatures of the one or more fourth private keys can be validated by the trusted key pinned by the client device; and reject the authentication challenge based at least in part on determining that the at least one signature of the one or more fourth signatures of the one or more fourth private keys is not validated by the trusted key.

16. The client device of claim 11, wherein the one or more processors are individually or collectively further operable to execute the processor-executable code to cause the client device to:

pin the trusted key during installation of an application associated with the authentication server.

17. The client device of claim 11, wherein the authentication challenge further comprises one or more third signatures corresponding to respective string values of the first public key signed via each private key of the one or more second private keys.

18. The client device of claim 11, wherein the one or more processors are individually or collectively further operable to execute the processor-executable code to cause the client device to:

retrieve, based at least in part on determining that the first public key is not the trusted key that is pinned by the client device, a resource comprising an indication of at least the trusted key that is pinned by the client device, wherein determining whether the at least one signature of the one or more second signatures of the one or more second private keys can be validated is based at least in part on the resource.

19. A non-transitory computer-readable medium storing code for key pinning, the code comprising instructions executable by one or more processors to:

receive an authentication challenge from an authentication server, wherein the authentication challenge comprises an indication of a first public key of a first keypair, a first signature of a first private key of the first keypair, and one or more second signatures of one or more second private keys of one or more second keypairs;

determine whether the first public key is a trusted key that is pinned by a client device;

determine, based at least in part on determining that the first public key is not the trusted key that is pinned by the client device, whether at least one signature of the one or more second signatures of the one or more second private keys can be validated by the trusted key pinned by the client device; and validate the authentication challenge based at least in part on determining that the at least one signature of the one or more second signatures of the one or more second private keys can be validated by the trusted key.

20. The non-transitory computer-readable medium of claim 19, wherein the one or more second signatures of the one or more second private keys comprise a plurality of second signatures of a plurality of second private keys.

* * * * *